May 1, 1962   R. E. OHAUS   3,032,132
WEIGHING DEVICE

Filed Oct. 14, 1959   4 Sheets-Sheet 1

INVENTOR.
Robert E. Ohaus,
BY Richards & Cifelli,
Attorneys

May 1, 1962
R. E. OHAUS
3,032,132
WEIGHING DEVICE
Filed Oct. 14, 1959
4 Sheets-Sheet 2
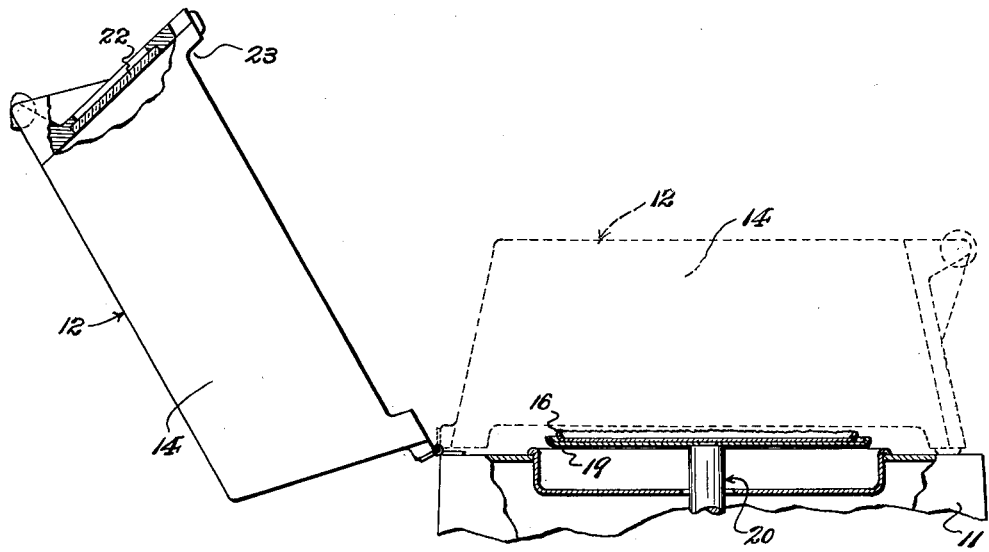
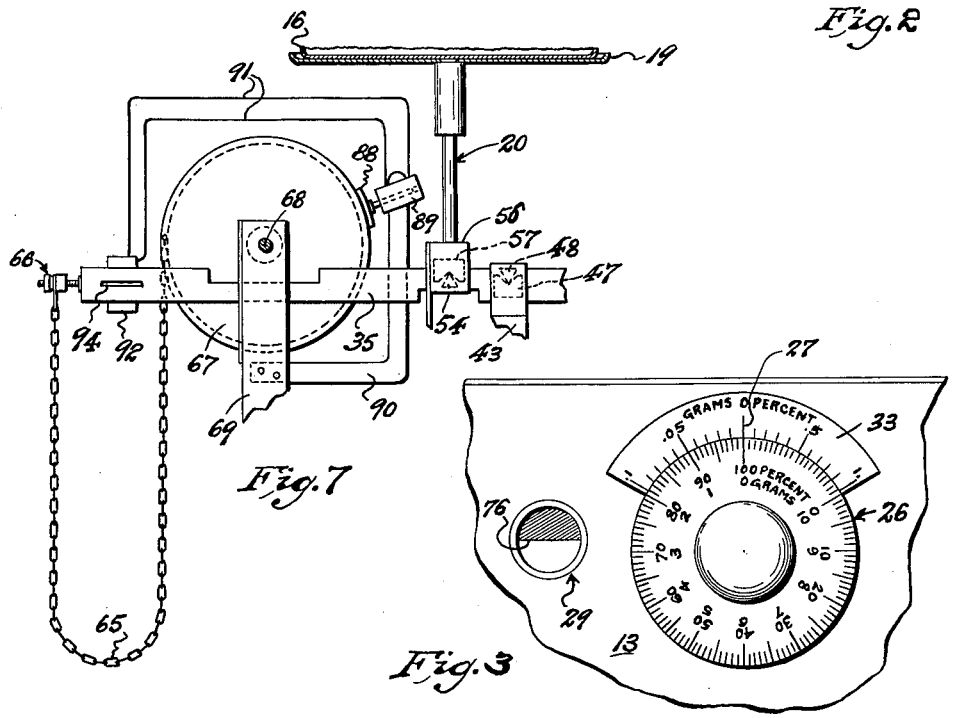
INVENTOR.
Robert E. Ohaus,
BY Richards & Cifelli,
Attorneys May 1, 1962

R. E. OHAUS 3,032,132

WEIGHING DEVICE

Filed Oct. 14, 1959

INVENTOR.
Robert E. Ohaus,
BY Richard & Cifelli,
Attorneys

May 1, 1962  R. E. OHAUS  3,032,132
WEIGHING DEVICE

Filed Oct. 14, 1959  4 Sheets-Sheet 4

INVENTOR.
Robert E. Ohaus,
BY Richards W Cifelli,
Attorneys

United States Patent Office 3,032,132
Patented May 1, 1962

3,032,132
WEIGHING DEVICE
Robert E. Ohaus, Westfield, N.J., assignor to Ohaus Scale Corporation, Union, N.J., a corporation of New Jersey
Filed Oct. 14, 1959, Ser. No. 846,290
2 Claims. (Cl. 177—171)

The invention relates to weighing devices. More particularly, it relates to weighing devices which are adapted to determine changes in weight of a test specimen, due for example to evaporation of moisture from the specimen.

There are in use many test devices adapted to operate in the manner that a test specimen is placed in a pan, mounted on the scale, weighed to obtain an initial weight, heated to evaporate volatiles and then weighed again to determine weight loss. The invention is concerned with providing improvements with respect to such devices.

An important application of weighing devices as described above is in production control. Thus, for example, in manufacturing process it may be required to dry a product to a particular moisture content. A sample of the wet product can be tested on the weighing device to obtain data relating to change in moisture content as a function of time for a given heating rate, and correlations based on previous testing can then be employed to convert the test data to required drying conditions for the production line to obtain the product dried to the extent desired. It will be recognized that such application of the weighing device is distinct from a laboratory application of an analytical balance. The personnel operating the weighing devices may not be skilled technicians, errors may result in a faulty product, and it may be necessary to obtain accurate results quickly and consistently. It is a principal object of the invention to provide weighing devices for moisture or volatile determination which meets the indicated requirements of such devices when used for production control.

Another object of the invention is to provide a basic construction for volatile testing which itself is adapted for manual operation and, which can be added to in a convenient manner to provide either automatic operation or automatic and manual operation. By manual operation is meant that change in weight is indicated on a dial or the like by manual manipulation of the dial, and by automatic operation is meant that the change is indicated on a dial or the like automatically.

A further object of the invention is to provide a device of the type adapted to test specimens of predetermined initial weight, and suitable for determining weight changes of up to 100 percent of the predetermined weight, and also suitable for weighing to obtain merely absolute weight of items weighing up to the amount of the predetermined weight.

A further object is to provide a weighing device suitable for weighing volatile changes of liquids. The feature of being able to indicate weight changes of up to 100 percent of the weight of the test specimen adapts the devices to such services. Another feature important in this service is providing for a ribbed weighing pan which is desirable in that it improves evenness of specimen distribution in the pan.

Another object of the invention is adaption of the device for use with what can be termed disposable weighing pans. Thus, different pans can be used notwithstanding there will be weight variation between pans. For example, pans formed of aluminum foil can be used, a new pan being employed for each weighing. The invention provides a zero adjusting means for facilitating adjustment to compensate for variations in pan weight.

The manner in which these and other objects are attained will be apparent from the following description taken together with the accompanying drawings. The devices depicted in the drawings are illustrations of particular embodiments of the invention and are not intended to relate the limits thereof.

In the drawings:

FIG. 2 is a view of the heater chamber of the unit shown in FIG. 1 and indicating the chamber lid in the raised condition, and, in phantom, in the closed condition;

FIG. 3 is a view of the weight indicating dial shown in FIG. 1, the setting being different;

Figure 5:
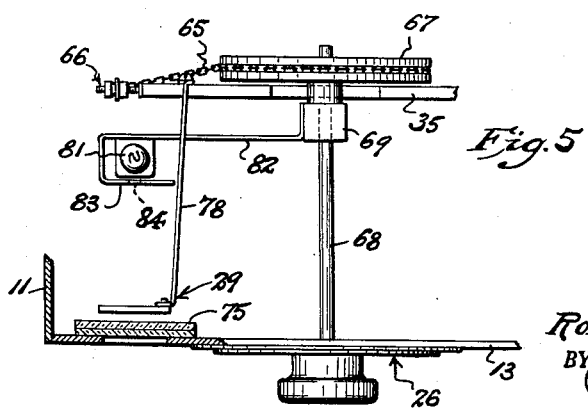
FIG. 5 is a plan view of a portion of the mechanism shown in FIG. 4 and taken along line 5—5 in FIG. 4.
Figure 6:
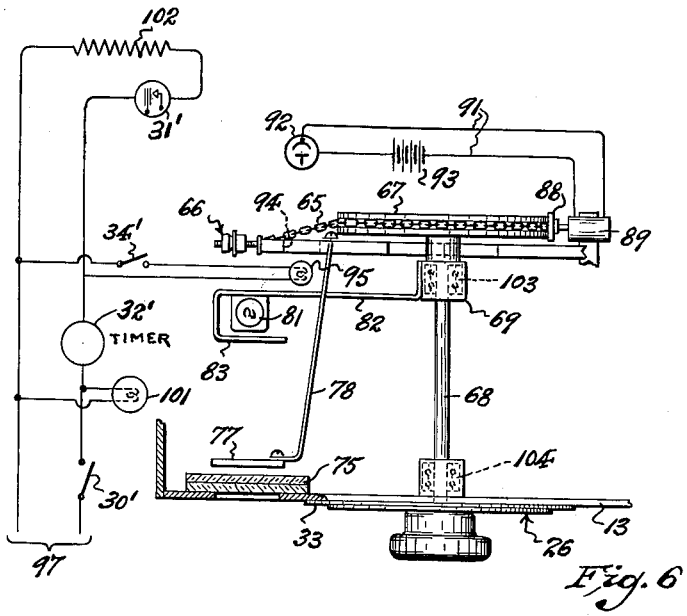
Figures 8, 9:
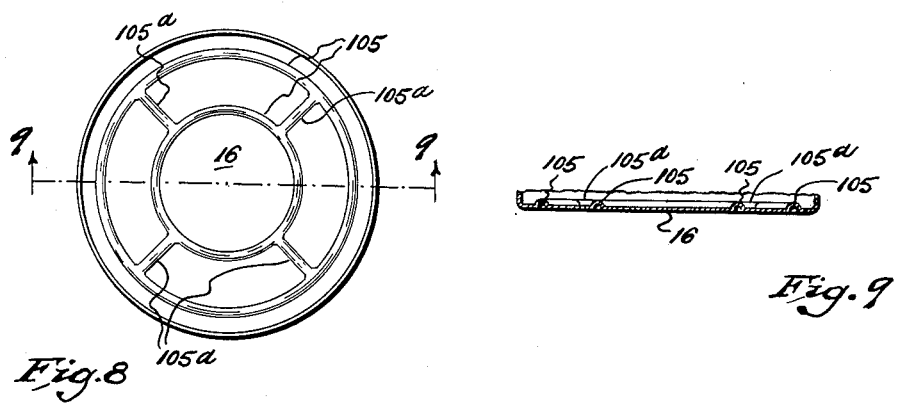

FIG. 6 corresponds with FIG. 5 and shows additions to the device shown in FIG. 5 which adapt the device to automatic operation;

FIG. 7 is an elevation view of the mechanism shown in FIG. 6;

FIG. 8 is a plan view of a disposable weighing pan according to the invention, and FIG. 9 is a view taken along line 9—9 of FIG. 8.

The device of the invention suited for manual operation can include a balance beam fulcrumed intermediate its ends, a pan support for carrying a pan adapted to contain the test specimen mounted on the balance beam on one side of the fulcrum, and a chain and chain carrier operatively mounted on the balance beam on one side of the fulcrum for varying weight on the side of the balance beam to which it is connected by operation of the chain carrier to shift weight of chain to and from the balancing beam and thereby compensate for change in weight delivered to the balance beam through the pan support. The chain has a throw between a first position in which the beam is substantially in balance with no test specimen carried by the pan support, and a second position in which the beam is substantially in balance when a test specimen of a predetermined weight, for example 10 grams, is applied to the pan support. Further, means can be provided for positioning the chain by actuation of the chain carrier at any position between the said first and second position. Thus, change in weight of the test specimen can be compensated for by manipulation of the chain carrier to bring the beam into balance. There can also be provided chain positioning indicating means for indicating the position of the chain carrier in terms of the weight of the test specimen. This arrangement adapts the device to indicate 0-100% change in weight of the test specimen and to make weighings for weights from 0 to the predetermined weight.

In a preferred embodiment of the manually operated device, a counterweight is mounted on one side of the balance beam, and the pan support and chain are mounted on the other side of the fulcrum. Thus, the weight of the chain acting on the balancing beam and the weight of the test specimen tend to balance the counterweight.

This preferred embodiment is particularly desirable because it lends itself to modification in a convenient manner so as to provide automatic operation of the device. Thus, scales according to said preferred embodiment can be produced and a few or as many as desired may be converted to automatic operation merely by the addition of parts with substantially no modification in the basic structure, i.e. the structure of the above-mentioned preferred embodiment for manual operation.

As indicated, the device for automatic operation includes a balancing beam, pan support, and chain and chain carrier as in the aforementioned preferred embodiment for manual operation. The chain carrier is advantageously in the form of a cylindrical drum, although other means will occur to those skilled in the art. The chain drum is mounted at a level to provide a dip in the run of chain between the balance beam and the chain drum, and the chain drum is mounted for rotation in response to chain weight of said run of chain acting thereon. Brake means provided for restraining rotation of the chain drum in response to said chain weight acting thereon. Further, there is provided brake control means which are responsive to change in weight applied to the balance beam and the chain drum, and the chain drum is mounted for rotation in response to chain weight of said run of chain acting thereon. Brake means are provided for restraining rotation of the chain drum in response to said chain weight acting thereon. Further, there is provided brake control means which are responsive to change in weight applied to the balance beam through the pan support, and effective upon reduction in pan support weight, to release the brake means and permit the chain weight to rotate the chain drum to pay out chain therefrom whereby the weight of chain acting on the balance beam is increased. Also, the brake control means is effective to arrest and restrain rotation of the chain drum upon chain paid out compensating for change in weight of the test specimen.

Desirably, the automatic device includes manually operable means for actuation of the chain drum, and the brake means when restraining rotation of the chain drum, yieldingly resists rotation thereof in response to operation of the manually operable means. Thus, the device can be provided so that it can be set for manual operation with the brake on and the brake control off, so that the manually operable means permits manually positioning the drum, and hence the chain, and the device operates in the manner described hereinbefore for the embodiments intended particularly for manual operation.

Referring to the drawings, wherein like reference characters refer to corresponding parts, the device comprises a main housing 11, in which scale mechanisms are contained, a heater housing 12 and a control panel 13. The housing 11 is provided with balancing feet 8 and spirit level 7 to permit accurate leveling of the unit. The device is operated in the following manner. The On-Off switch 30 is moved to the one position and the arrest-release knob 9 is turned to the "release" position to release the mechanism within the main housing 11 for operation. The hinge mounted cover 14 of the heater housing 12 is raised to the position indicated in full lines in FIG. 2 and a disposable pan 16 is rested on the receiving platform 19 of the pan support 20. The device is then zeroed by turning the weight indicating dial 26 to the position shown in FIG. 3, i.e. with the mark for 100 percent and 0 grams coinciding with the hairline 27. The zero adjustment knob 28 is then manipulated so that the balancing beam of the mechanism is in balance, the effect of this being to compensate for variation in pan weight from the nominal pan weight. The balanced condition of the balancing beam is indicated by the shadow type indicating viewer 29. After zeroing the instrument in this manner, the indicating dial 26 is turned counterclockwise to the position indicated in FIG. 1, i.e. with the mark for 0 percent and 10 grams coinciding with the hairline 27. Material to be tested is then added until the indicating viewer 29 indicates the balanced condition. The amount of test specimen will then be just 10 grams, and this weight is a characteristic of the particular device shown in the drawing, i.e., this device is especially adopted to test 10 gram samples. Samples of smaller size can be tested if desired, but the dial 26 is constructed to give percentages in terms of a 10 gram sample.

Figure 1:
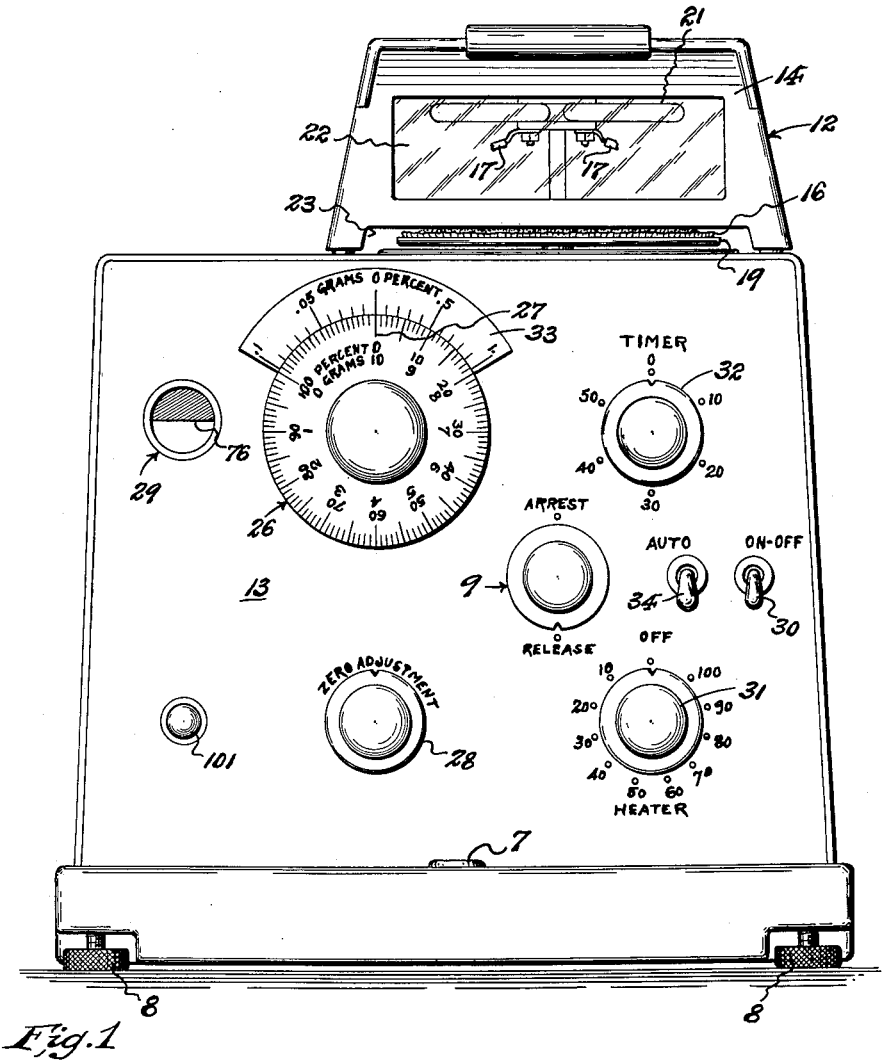
FIG. 1 is a front elevation showing an operating panel and heater chamber for a weighing device of the invention.

The heater housing cover 14 can then be returned to its normal position as indicated in FIG. 1 and, in phantom, in FIG. 2. A heating element 21, having power leads 17 and a reflector 25, is contained in the heater housing 12, and is adjustably mounted on a calibrated post 22′, in a manner known in the art and therefore not illustrated in detail. To permit viewing of the test specimen, a window 22 is arranged in the front wall of the heater housing, and to facilitate drying of the specimen, the cover is constructed to provide openings 23 along the lower edges of the cover, and openings 24 in the top of the cover, the function of the openings being to permit air currents to flow through the housing.

The heater knob 31 is actuated to set the amount of heat applied to the specimen, and the timer knob 32 is actuated to set the time period over which heat is to be applied. At the conclusion of said time period, the heater turns off automatically, and, if the device is being operated manually, weight change is determined by turning indicator knob 26 to bring the mechanism into balance, which condition will be shown by the indicating viewer 29, and for this condition the weight loss in percent and the weight remaining in the pan 16 can be read off from under the hairline 27. A vernier scale 33 is provided to permit accurate readings. When the device is to operate automatically, the automatic switch 34 is turned on when the heater 21 is turned on, and after the unit is turned off by operation of the timer controlled by timer knob 32, the indicating dial indicates the weight loss in percent and weight of remaining sample, and the indicating dial is locked or retained in this condition so that the results can be read off at any time after the test is complete.

Figure 4:
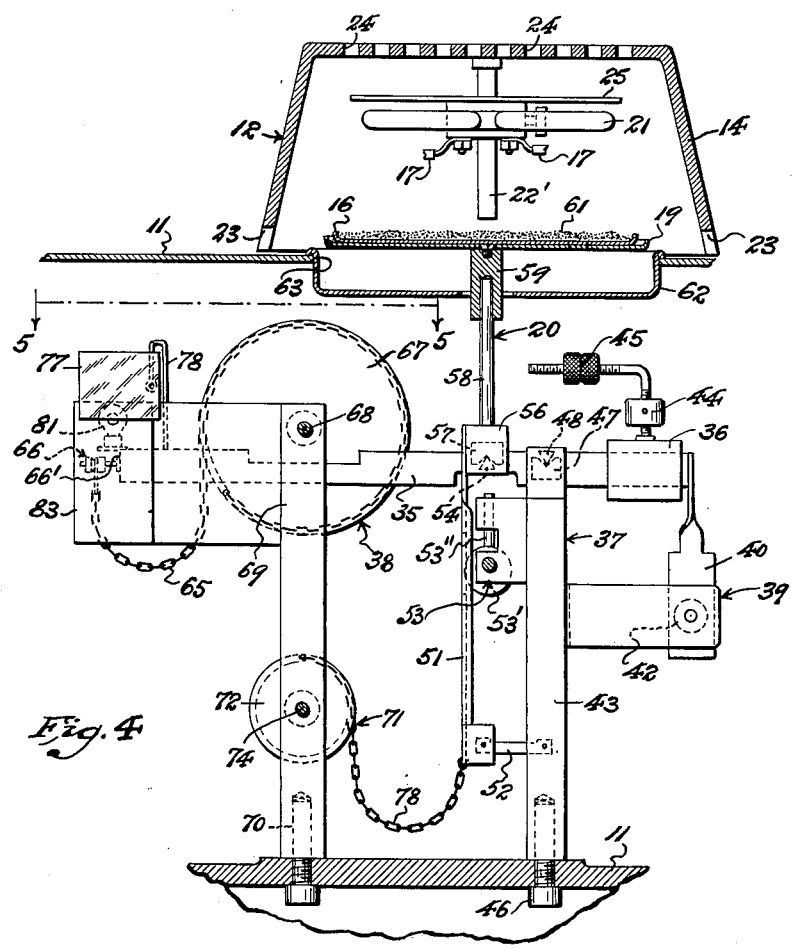
FIG. 4 is an elevation view of the mechanism of the device shown in FIG. 1, except the mechanism shown is for an embodiment suited for manual operation only.

A mechanism suitable to permit manual operation of the device of the invention is shown in FIGS. 4 and 5. As is there shown, the mechanism comprises a balance beam 35 fulcrumed intermediate its ends and having a counterweight 36 mounted in a permanent manner on a rearward arm extending from one side of the fulcrum 37, and a pan support 20 and a chain and a chain carrier 38 cooperative with a forward arm extending from the other side of the fulcrum.

A magnetic damping vane 39 is mounted on the counterweight side of the fulcrum, the damping unit including copper vane 40, and magnets 42 which are secured to the fulcrum post 43. The counterweight 36 is provided with sensitivity adjustment nuts 44 and balance adjustment nuts 45. These adjustment means are provided for infrequent adjustments of the device such as may be required after shipment. The fulcrum post 43 is secured in place in the main housing 11 by a screw 46, and carries agate bearings 47 in its upper end portion for receiving and bearing the knife edge 48 of the balancing beam 35.

The pan support 20 is secured to a bearing retaining block 56 which connects it with the fulcrum post 43 by a parallelogram linkage including a portion of the balancing beam, depending arm 51, cross arm 52 and a portion of the fulcrum post 43. The cross arm 52 can advantageously be knife edge mounted as is described in my U.S. Patent 2,729,439. Bearing lift 53 including cam wheel 53′ and lift rod 53″ is provided to permit placing the device in the arrest position by raising the agate bearings 57 off the knife edge 54.

The pan support is mounted on the balancing beam by way of knife edge 54 which bears against agate bearing 57 housed in the bearing retaining block 56. The pan support includes a post 58 having secured thereto by way of a connecting sleeve 59, the pan platform 19. The platform 19 is adapted to receive the pan 16 carrying the test specimen 61. Disposing the pan above the balancing beam is desirable as this provides the pan in a conveniently accessible location and permits arranging the pan so that pan supporting structure and other parts of the balance do not interfere with the accessibility of the pan. Mounting of the pan support in the manner indicated is highly advantageous as it adapts the device for carrying loads on the pan support which are off-center, i.e. unevenly distributed with respect to the pan support post 58.

To prevent material being weighed or dirt, lint and the like from entering the main housing 11, a dust pan 62 is mounted beneath the pan platform 19. This dust pan 62 fits in an opening 63 provided therefor in the main housing 11 and is removable so that it can easily be removed to empty material contained therein.

The chain and drum 38 are mounted in the manner that the chain 65 has one end thereof secured to the end of the balance beam 35 by chain suspension pivot 66, which can be adjusted as is necessary for calibration of the weighing device and is intended for factory adjustment. A lock nut 66' is provided for securing the chain suspension pivot in place following calibration. The other end of the chain is secured to a first drum 67 and the drum is mounted on the shaft 68 for rotation therewith. The shaft 68 is journaled in drum support post 69 which in turn is secured to the main housing 11 by screw 70. The shaft 68 extends through the operating panel 13 of the main housing 11 and has mounted thereon the indicator dial 26. By manipulation of the indicator dial 26, the position of the chain can be adjusted to add weight to or take weight off the balancing beam 35.

Also mounted on the drum support post 69 is a chain and drum 71 which provides a zero adjustment for the device. This unit includes a second drum 72 and the chain 78, one end of the chain being secured to the drum and the other end to the depending arm 51 of the pan support parallelogram linkage for the pan support 20. The drum 72 is mounted on a shaft 74 for rotation therewith, and this shaft extends through the operating panel 13 and has secured thereto the zero adjustment knob 28. The zero adjustment operates in the manner that rotation of the knob adds weight to or takes weight off the pan support 20, depending on the direction in which the drum 72 is rotated.

The shadow indicating viewer 29 includes the window 75 having a hairline 76, a shadow throwing plate 77 mounted by means of a bracket 78 on the balance beam 35, a light source 81 and a light beam plate 82 which is mounted by means of bracket 83 on the chain drum support 69. These elements operate in the usual manner, the light source 81 and beam plate 82 being fixedly positioned and casting a light beam through the light beam plate aperature 84. The light beam is partly intercepted by the shadow plate 77 so that a shadow is cast on the glass 75. The shadow plate 77 moves with the balancing beam 35 and when the beam is in balance the shadow coincides with the hairline 76.

Whereas drums and chains are preferred for the weight shifting units connected with the post 69, other equivalent means will occur to those skilled in the art. A feature of the drum and chain units of the device of the drawings is that the drums are of such size that the chain can be fully wound thereon without axial displacement thereof so that characteristics of the chains are not altered by axial displacement. A feature of the chain and drum 38, which is mounted on the balance beam 35 is that the chain runs depending from the balance beam and the drum traverse vertical paths. This construction also reduces change in scale characteristics.

It will be noted that the chain 65 is connected to the balance beam 35 outwardly of the pan support 20. Mounting of the chain 65 far from the balance beam pivot is desirable since smaller chain links can then be used and hence operation of the unit will be more uniform and the unit will be more sensitive.

The operation of the manually operated unit of FIG. 4 and FIG. 5 is as follows. The adjusting pivot 66 can be factory set and the adjusting nut 45 can be set upon installation of the device. A weighing pan 16 is placed on the platform 19 and the chain drum 67 is moved to a first position in which a relatively large weight of chain is applied to the balancing beam, at which time the chain will be in the position indicated in FIG. 7. The chain can be brought to this first position by moving the indicator dial 26 so that the 100% mark thereof coincides with the hairline 27. The shadow viewer indicator 29 will then indicate that the balance beam is approximately in the balanced condition.

The device is then zeroed by manipulation of the zero adjustment knob 28 which adds or takes off chain weight from the depending arm 51 of the parallelogram linkage of the pan support 20. In this manner variation in weight of the disposable pan 16 is compensated for.

After zeroing the instrument the chain drum 67 is moved to a second position in which a relatively small weight of chain is applied to the balancing beam 35, at which time the chain will be in the position indicated in FIG. 4 and the indictaor dial 26 will be in the position shown in FIG. 1, i.e. with the zero percent line coinciding with the hairline 27. The balance beam 35 will then be out of balance.

The material 61 to be tested is then added to the pan 16 until 10 grams has been added, which condition will be indicated by the balance beam 35 coming into balance. Drying of the material is effected by operation of the heater 21 as hereinbefore described.

The amount of moisture evaporated from the material can be determined at any time by manipulating the drum 67 to bring the balance beam into balance, and the change in moisture content will then be indicated by the reading on the indicator dial 26. It is characteristic of the device that the equivalent of a predetermined weight (in the case of the device of the drawing, 10 grams) of test specimen, will balance the balance beam. This weight can be made up of any combination of the actual weight of the test specimen and the chain 65 and the combination will be indicated in terms of weight of the test specimen on the indicating dial 26. The grams scale on the indicating dial will show the absolute weight of the test specimen and the percentage scale will show the percentage weight loss of the test specimen. An accuracy of plus or minus 0.1%, for moisture loss, can conveniently be obtained with the device.

The throw of the chain 65 between the first position (FIG. 7) and the second position (FIG. 4) corresponds with a change in weight of test specimen of 100% or 10 grams so that any extent of weight change of the test specimen can be determined with the balance. Moreover, the device can be used to weigh a specimen up to 10 grams in weight. To do this, the specimen is merely put on the pan 16 and the device brought into balance by operation of the indicator dial 26. The weight of the specimen can then be read directly in grams on the indicator dial.

A device according to the invention and adapted for automatic or manual operation can be of the construction indicated in FIG. 4 and FIG. 5 modified as is indicated in FIG. 6 and FIG. 7. The shaft 68 of the chain drum 67 is mounted in ball bearings 103 and 104 so that it will rotate in response to the weight of the run of chain depending from the drum 67. A brake 88 is provided for restraining rotation of the drum 67 in response to the weight of chain acting thereon and urging it to rotate. Brake control means are provided for controlling the action of the brake 88. The brake control means are schematically represented in the drawings, and these means comprise a circuit including a solenoid 89, photoelectric cell 92, battery 93 and the light source 95. The brake control means automatically maintains balance beam 35 in the balanced condition. A slit 94 is provided in the balance beam 35 and when the beam rises due to loss of moisture from the sample, light from light source passes through the slit 94 and activates the photoelectric cell 92. This in turn closes the control means circuit so that the solenoid is energized and the brake 88 then becomes disengaged from its normal position. The drum then rotates in response to the urging of the chain 65 whereupon the weight loss which caused the brake to operate is compensated for, the beam comes back into balance, the slit 94 moves out of the path of light source 95 to the cell 92 and the solenoid 89 becomes de-energized causing the brake to again operate and thereupon again arrest movement of the drum 67 with the balance beam 35 in the balanced condition.

The manner in which the electrical automatic control elements are connected into the circuit is indicated in FIG. 6. The light source 95 is connected across supply lines 97 and a switch 34' for the automatic control is connected in the leads to the light source 95. The On-Off switch 30' for the unit is connected in the supply lines 97, and a pilot light 101 is connected to indicate when the unit is energized. Timer 32' heat control switch 31', which is the bi-metallic type adapted to limit the period during which line votage is applied to the heater, and the heater 102 are connected in series with the power supply 97. With the On-Off switch 30' closed, and the automatic switch 34' closed, the unit operates automatically as is described hereinbefore. At the end of the heating period, the timer 32' opens the circuit so that the light source 95 is de-energized. Hence, the brake 88 will remain in the On condition and the dial indicator 26 will indicate the percentage weight loss of the sample at the end of the test period.

When it is desired to operate the unit manually and without the aid of the automatic feature, switch 34' is moved to or left in the open condition and the brake 88 is then rendered inoperative with the brake in the On position, i.e. restraining rotation of the drum 67. The device is then operated in the manner described hereinbefore in reference to FIGS. 4 and 5, the brake 88 being such that it can be overpowered by manual operation of the shaft 68.

The disposable weighing pans provided for use with the device of the invention are shown in FIG. 8 and FIG. 9. The pan 16 is characterized in that it has concentric axially extending ribs 105 and radially extending ribs 105a. These ribs tend to distribute liquid evenly in the pans and hence facilitate the testing of liquid specimens.

Having now described my invention, what is claimed is:

1. A weighing scale for determining weight and change of weight of a test specimen, such as one wherein moisture content of the specimen is evaporated by applied heat with weight changing effect, comprising a balance beam fulcrumed intermediate its ends to provide a forward arm and a rearward arm, a support for a pan adapted to contain the test specimen and mounted in connection with the forward arm of said balance beam, a counterweight carried by the rearward arm of said balance beam, a first rotatable chain drum supported adjacent said forward arm of the balance beam, a chain connected between the free end of the forward of the balance beam and said drum, rotation of said drum being adapted to shift the applied weight of the chain relative to the balance beam and thereby compensate for change in weight delivered to the balance beam by the pan support and carried test specimen, the chain having a throw between a first position in which the balance beam is substantially in balance when no test specimen is carried by the pan support and a second position in which the balance beam is in substantial balance when a test specimen of predetermined weight is carried by the balance beam, a weight change indicating dial rotatable with said chain drum, a stationary scale bearing a hair line traversed by the change indicating dial, means to cause actuation of the chain drum and indicating dial to dispose the chain in any position between said first and second positions whereby change in weight of the test specimen is compensated and indicated, a second rotatable chain drum also supported adjacent to the forward arm of the balance beam, a second chain connected between the forward arm of the balance beam at the pan support and said second drum, and means for manually rotating said second drum to thereby vary the effective weight of said second chain as applied to the balance beam and pan support in compensation for variations in weight of selected pans mounted on the pan support and means to visibly indicate balanced condition of the balance beam.

2. A weighing scale according to claim 1, wherein the pan support is connected with the balance beam fulcrum by a parallelogram linkage.

References Cited in the file of this patent

UNITED STATES PATENTS

| 2,004,745 | Becker | June 11, 1935 |
| 2,230,491 | Huesser | Feb. 4, 1941 |
| 2,244,523 | Hess | June 3, 1941 |
| 2,322,813 | Beck | June 29, 1943 |
| 2,622,438 | Campbell | Dec. 23, 1952 |
| 2,729,439 | Ohaus | Jan. 3, 1956 |
| 2,884,239 | Ghezzi | Apr. 28, 1959 |

FOREIGN PATENTS

| 11,452 | Great Britain | 1889 |
| 494,362 | Great Britain | June 29, 1943 |
| 646,694 | Great Britain | Nov. 29, 1950 |